(12) United States Patent  
Hadfield et al.

(10) Patent No.: US 8,887,188 B2  
(45) Date of Patent: Nov. 11, 2014

(54) SYSTEM AND METHOD FOR TELEVISION ADVERTISEMENT AUDIENCE MEASUREMENT

(71) Applicant: Rentrak Corporation, Portland, OR (US)

(72) Inventors: Kim Hadfield, Vancouver, WA (US); Amir Yazdani, Portland, OR (US); Michael Vinson, Piedmont, CA (US)

(73) Assignee: Rentrak Corporation, Portland, OR (US)

( * ) Notice: Subject to any disclaimer, the term of this patent is extended or adjusted under 35 U.S.C. 154(b) by 0 days.

(21) Appl. No.: 13/891,113

(22) Filed: May 9, 2013

(65) Prior Publication Data

US 2013/0305273 A1 Nov. 14, 2013

Related U.S. Application Data

(60) Provisional application No. 61/644,644, filed on May 9, 2012.

(51) Int. Cl.
*H04N 7/16* (2011.01)
*H04N 21/442* (2011.01)

(52) U.S. Cl.
CPC ............... *H04N 21/44204* (2013.01)
USPC ............ 725/14; 705/14.4; 709/217

(58) Field of Classification Search
CPC .......... H04N 21/812; H04N 21/44222; H04N 21/25883

USPC ............... 725/14, 35; 705/10, 14.1, 14.4, 26; 709/217–232

See application file for complete search history.

(56) References Cited

U.S. PATENT DOCUMENTS

| | | | |
|---|---|---|---|
| 7,222,099 B2 * | 5/2007 | Forsythe et al. | 705/40 |
| 8,051,444 B2 | 11/2011 | Shkedi | |
| 8,112,301 B2 * | 2/2012 | Harvey et al. | 705/7.29 |
| 8,365,213 B1 | 1/2013 | Orlowski | |
| 2009/0210899 A1 * | 8/2009 | Lawrence-Apfelbaum et al. | 725/34 |
| 2011/0239243 A1 | 9/2011 | Dierks et al. | |
| 2011/0320260 A1 | 12/2011 | Briggs | |
| 2013/0035975 A1 | 2/2013 | Cavander et al. | |
| 2013/0036434 A1 | 2/2013 | Shkedi et al. | |

* cited by examiner

*Primary Examiner* — Annan Shang
(74) *Attorney, Agent, or Firm* — Perkins Coie LLP

(57) ABSTRACT

A system and methods to calculate ratings of television advertisements based on viewing data and to assess the effectiveness of the advertisements. In some embodiments, consumer viewing data is consolidated across a plurality of disparate channels through which content and advertisements are presented to viewers. Some of the channels may provide information directly to the system about which advertisements were presented to viewers. In some embodiments, the system may instead determine whether an advertisement was likely viewed based on scheduling data associated with the presentation of content and advertisements. The system may provide additional algorithms for rating advertisements based on the consolidated information. That is, the system may allow performance of advertisements to be compared against other advertisements across a desired population of viewers. Embodiments may further provide information for a graphical user interface to assess the ratings and results.

20 Claims, 14 Drawing Sheets

| Advertiser / Brand (510) | Category (520) | Ad Copy (530) | Time Offset (540) | Duration (550) | Ad Group Position (560) | Live HHs (582) | DVR HHs (584) | Total HHs (586) | Rating (590) |
|---|---|---|---|---|---|---|---|---|---|
| Puget Sound Blood Center | Public Service Announcement | | 0:06:42 | 30 sec | 1 | 2,180,000 | 155,000 | 2,335,000 | 8.791 |
| Drug Abuse Resistance Education | Public Service Announcement | | 0:07:12 | 30 sec | 2 | 2,140,000 | 102,000 | 2,242,000 | 8.441 |
| Susan G. Kommen Foundation | Public Service Announcement | | 0:07:42 | 30 sec | 3 | 2,135,000 | 90,000 | 2,225,000 | 8.377 |
| Drug Abuse Resistance Education | Public Service Announcement | | 0:08:12 | 30 sec | 4 | 2,120,000 | 87,000 | 2,207,000 | 8.309 |
| Desperate Housewives | Promotionals | Secrets and truths unfold through... | 0:08:42 | 30 sec | 5 | 2,170,000 | 131,000 | 2,301,000 | 8.663 |
| Geico | Insurance | Switch & You Could Save $500+... | 0:18:00 | 30 sec | 1 | 2,420,000 | 210,000 | 2,630,000 | 9.902 |
| Alka-Seltzer Plus | Cold & Sinus Remedies | Specially Formulated To Relieve... | 0:18:30 | 30 sec | 2 | 2,400,000 | 110,000 | 2,510,000 | 9.450 |
| ARCO (570) | Petroleum Companies | Straight Up Gas: No More Fees... | 0:19:00 | 30 sec | 3 | 2,380,000 | 112,000 | 2,492,000 | 9.382 |

Ad Occurrence Search (Daily From 03/18/13 to 04/14/13)
Filtered by: All Day, Networks Last 4 Weeks ▾ | From 03/18/2013 | To 04/14/2013 | All Day▾ | Networks▾ | Go

| Parent | Advertiser | Category | Brand | Product |
|---|---|---|---|---|
| Apple Computer Inc | apple / Apple | Wireless Home/ Business P | Apple iPhone | Apple iPhone 5 / Apple iPad |

- 701 — Last 4 Weeks
- 703 — Parent box
- 704 — Advertiser
- 705 — Category
- 706 — Brand
- 707 — Product
- 702a–702e Load Ad Group ▾
Save | Clear

*FIG. 7*

| Export Selected Ad Copies | | | | | | | | | |
|---|---|---|---|---|---|---|---|---|---|
| View Selected Ad Copies by Network | View Selected Ad Copies by Series | | | | | | | | |

Weeks available for selected filters: 09/17/2012-10/22/2012, 11/19/2012-12/17/2012, 12/31/2012-01/28/2013, 03/04/2013-04/01/2013
Search Results (4)

| | | Ad Copy Detail | | | | | Overall (03/18-04/14) | Mar '13 (03/18-03/31) | Apr '13 (04/01-04/14) |
|---|---|---|---|---|---|---|---|---|---|
| Parent | ⇅ Advertiser | Category | Brand | Product | Ad Copy | Activity Window | Duration (secs) | Airings Networks | Airings Networks | Airings Networks |
| Apple Computer Inc | Apple | Wireless Home/ Business Ph... | Apple iPhone | Apple iPhone 5 | Sweet, Brilliant, Rise | 03/18/13 - 04/06/13 | 30 | 237  25 | 234  24 | 3  1 |
| Apple Computer Inc | Apple | Wireless Home/ Business Ph... | Apple iPhone | Apple iPhone 5 | Rock, Sharp, Discover/ Spri... | 03/18/13 - 03/31/13 | 30 | 74  8 | 74  8 | -  - |
| Apple Computer Inc | Apple | Wireless Home/ Business Ph... | Apple iPhone | Apple iPhone 5 | Rock, Sharp, Discover | 03/18/13 - 04/06/13 | 30 | 155  18 | 152  17 | 3  1 |
| Apple Computer Inc | Apple | Wireless Home/ Business Ph... | Apple iPhone | Apple iPhone 5 | Sweet, Brilliant, Rise/ AT... | 03/18/13 - 03/31/13 | 30 | 26  11 | 26  11 | -  - |
| - | | | | | | | - | 492  62 | 486  60 | 6  2 |

SYSTEM AND METHOD FOR TELEVISION ADVERTISEMENT AUDIENCE MEASUREMENT

CROSS-REFERENCE TO RELATED APPLICATION(S)

This application claims priority and the benefit of U.S. Provisional Application 61/644,644, entitled SYSTEM AND METHOD FOR TELEVISION ADVERTISEMENT AUDIENCE MEASUREMENT filed on May 9, 2012.

BACKGROUND

A television advertiser derives value from the number of audience members who watch its advertisements. However, instead of determining advertisement value based on the number of audience members who have actually viewed an advertisement, the television advertising industry often judges the value of an advertisement indirectly based on other data. For example, the industry may track and utilize the number of consumers who have viewed a program in which the advertisement is placed (e.g., the Television Rating points or "TVR" points of the program). As another example, the industry sometimes breaks daily viewing periods into "dayparts" and may measure value based on the expected viewership during a particular daypart (e.g., "prime time," etc.). For an advertising campaign containing multiple advertisements, the Gross Rating Points ("GRPs") for the advertising campaign is also often determined based on the TVR points of the one or more programs associated with the advertising campaign. Audience demographics are also often utilized to define the audience population from which the ratings may be determined.

Relying on these proxy factors rather than the number of viewers of the advertisement itself may present an inaccurate picture of the advertisement's true value to an advertiser. For example, advertisers may assume that viewers are more likely to view the first advertisement in a sequence of advertisements before changing channels during commercial breaks. Accordingly, advertisers may pay a price premium to place their advertisements in the first position of a contiguous group of ads. However, some viewers may use Digital Video Recorders (DVRs) to fast forward and skip advertisements automatically, regardless of the advertisement's group position. Accordingly, advertisers should adjust their advertisement budget allocations to anticipate this capability.

The existing methods of the advertising industry also do not properly account for the particular character of individual viewer preferences. Some viewers are more likely to watch advertisements that they find personally appealing. This personal preference may influence the likelihood a user will view advertisements following the personally appealing advertisement, as there may be a delay before the viewer switches channels. A program's TVR points are a very blunt tool for assessing the personal preferences and number of viewers. Furthermore, the number of viewers watching a program can significantly vary over the duration of a program. For example, an appealing program may gather additional viewers as the program progresses. Conversely, a disappointing program may lose viewers as the program progresses. As a result, the number of viewers watching different advertisement groups occurring at various positions in the program may also vary significantly. The actual number of viewers who viewed the advertisement, wherever it appeared in the program, would be a more useful measure of the advertisement's reach.

Unfortunately, acquiring and integrating raw viewing data into a form conducive to analysis can be very difficult. This is especially true considering the disparate character of various networks, scheduling procedures, and collection techniques. Although much of the description herein discusses television advertisements, one will recognize that similar issues may be confronted by Internet streamlining delivery systems and other media content delivery methods. Until a more effective viewer-based method of assessment can be determined, the industry will continue to rely on blunt tools to price advertising.

Accordingly, there exists a need to measure the number of viewers of an advertisement with greater precision and to incorporate that information into an analysis of the impact across a plurality of different media channels.

BRIEF DESCRIPTION OF THE DRAWINGS

One or more embodiments of the present disclosure are illustrated by way of example and not limitation in the figures of the accompanying drawings, in which like references indicate similar elements.

FIG. 5 is a data table depicting advertisement schedule data as may be received by the system, as well as analysis data generated by the system, as may be presented via a Graphical User Interface (GUI).

FIG. 7 is an illustration of a GUI depicting an advertisement occurrence search.

FIG. 8 is an illustration of a GUI depicting a listing of advertisement copies/instances.

FIG. 9 is an illustration of a GUI depicting an advertisement detail.

DETAILED DESCRIPTION

A system and methods to calculate ratings of television advertisements based on viewing data and to assess the effectiveness of the advertisements is disclosed herein. In some embodiments, consumer viewing data is consolidated across a plurality of disparate channels through which content and advertisements are presented to viewers. The channels include cable, satellite, networks like the Internet, etc. Some of the channels may provide information directly to the system about which advertisements were presented to viewers. In some embodiments, the system may instead determine whether an advertisement was likely viewed based on scheduling data associated with the presentation of content and advertisements. By integrating information across disparate channels, a more holistic perspective of the advertisement's impact may be achieved. Moreover, by estimating actual viewership of advertisements, rather than relying on viewership associated with related content, the system provides advertisers a better assessment of the performance of the advertisements.

In some embodiments, the system provides additional algorithms for rating advertisements based on the consolidated information. That is, the system allows performance of advertisements to be compared against other advertisements across a desired population of viewers. Embodiments may further provide information for a graphical user interface to assess the ratings and results.

Advertisement Data Collection Topology

Figure 1:
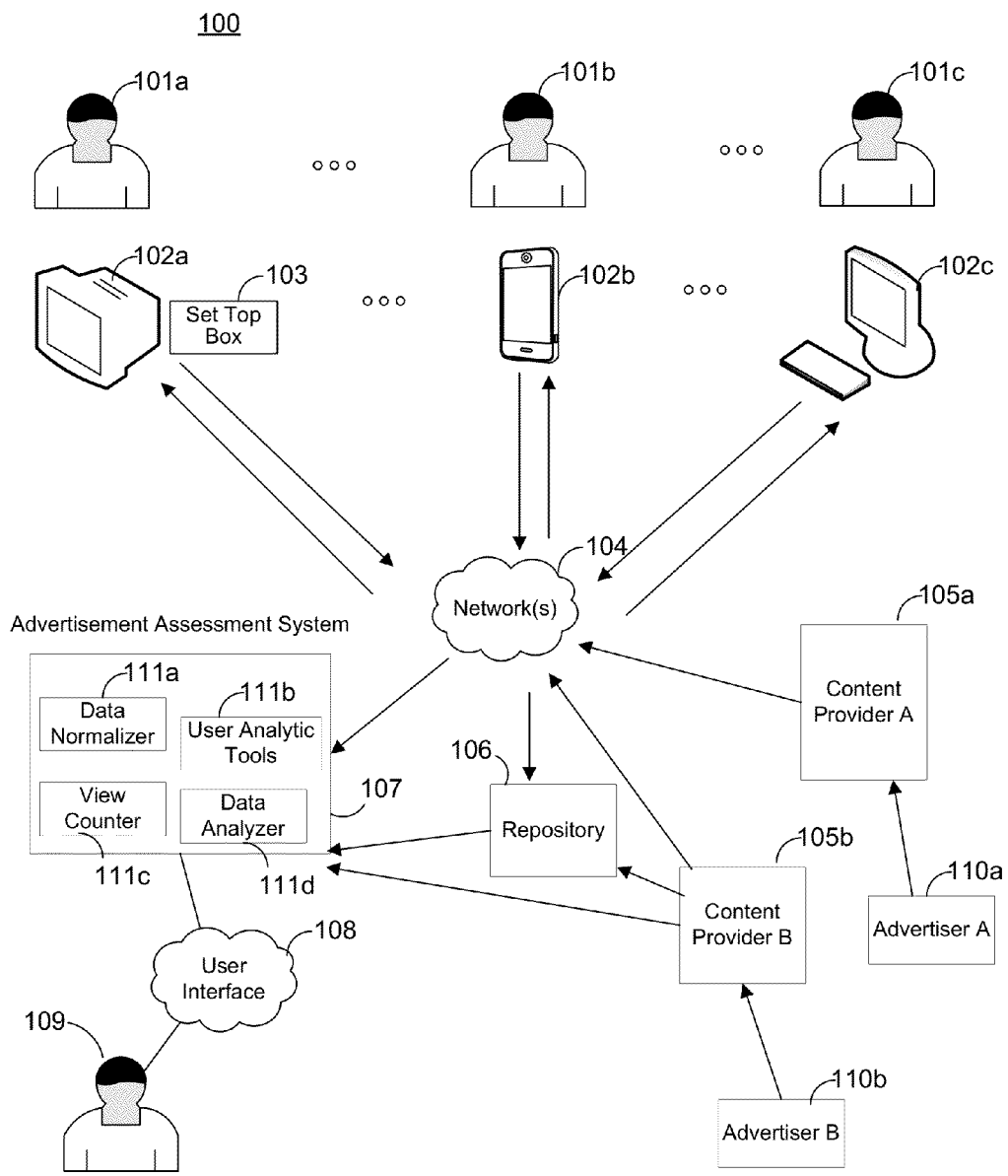
FIG. 1 is a block diagram depicting the advertisement data collection and analysis topology.

FIG. 1 is a block diagram depicting an advertisement data collection topology 100 used in certain of the embodiments. A plurality of advertisers 110a-b may wish to present their advertisements to a plurality of viewers 101a-c. Each viewer may view content on a plurality of different receiving devices 102a-c, e.g., television 102a, a mobile device 102b, an Internet connected computer 102c, etc. To reach the viewers 101a-c the advertisers 110a-b provide their advertisements to content providers 105a-b. The content providers 105a-b may be website owners, television network programmers, radio station owners, etc. The content providers 105a-b may provide their content to viewers 101a-c across a plurality of media via network(s) 104. Network(s) 104 may include the Internet, internal corporate networks, television broadcasting channels, cable television, satellite television, other wired or wireless networks, etc.

One or more of the receiving devices 102a-c may include software, hardware, or firmware to facilitate recording of the respective viewer's 101a-c viewing of content, possibly including advertisements. For example, a set top box 103 may be used to record the viewer 101a's viewing habits via television 102a. These recording devices may forward information regarding a viewer's viewing habits periodically or aperiodically via the networks 104 to a repository 106 for storage or to an advertisement assessment system 107 directly. Some recording devices, such as set top box 103, may be explicitly designed to record viewership activity, whereas other recording devices and methods may be tacitly applied in view of the content delivery method. For example, an on demand service may record requests made by its customers, an internet website may record content requests from users, etc.

The set top boxes/recording devices could also include digital video recorders (DVR), gaming consoles, or other electronic components which allow a user to tune to a desired audio/video stream. Broadly stated, the phrase "set top box" is used herein to refer to any device, component, module, or routine that enables tune data to be collected from an associated video playback device. Set top boxes may be stand-alone devices or set top box functionality may be incorporated into the receiving devices.

Advertisement assessment system 107 may be a computer device, or collection of computer devices, as discussed in greater detail herein. The advertisement assessment system 107 may poll the repository 106 for new viewing information over time. The repository 106 may be provided by an aggregator of such data (e.g., a cable operator, satellite operator, or other network operator, etc.) and may be the same as a content provider in some embodiments.

In some systems, the content providers 105a-b may be able to monitor when a viewer is exposed to an advertisement, e.g., when the viewer requests the advertisement directly, or when viewing of the advertisement is required by the content provider prior to delivery of the content. Thus, a content provider, e.g., provider 105b, may notify the repository 106 or the assessment system 107 directly that the advertisement has been viewed.

The advertisement assessment system 107 may normalize the data across all the different content provider and recording devices' particular protocols, delivery procedures, etc., using a data normalizer 111a. The assessment system 107 counts the number of views using view counter module 111c. The system 107 may then analyze the data using a data analyzer 111d. A user 109 may then review the data, e.g., using analytic tools 111b via an interface 108.

One will recognize that though the modules 111a-c are presented and discussed individually, they may be grouped into a single device or software program and/or implemented on a single firmware, software, or hardware component or distributed across a plurality of components. Similarly, though user interface 108 is depicted as being directly accessible to user 109, in some embodiments the user 109 may access the results of the assessment system 107 through a separate service. For example, user 109 may be one of advertisers 110a-b who pay a fee to the owner of the assessment system 107 to view the results of their advertising campaign. In some embodiments the user 109 participates in the analysis by selecting elements to filter and adjusting the criterion by which viewing counts are assessed.

Advertisement Channel Distribution

Figure 2:
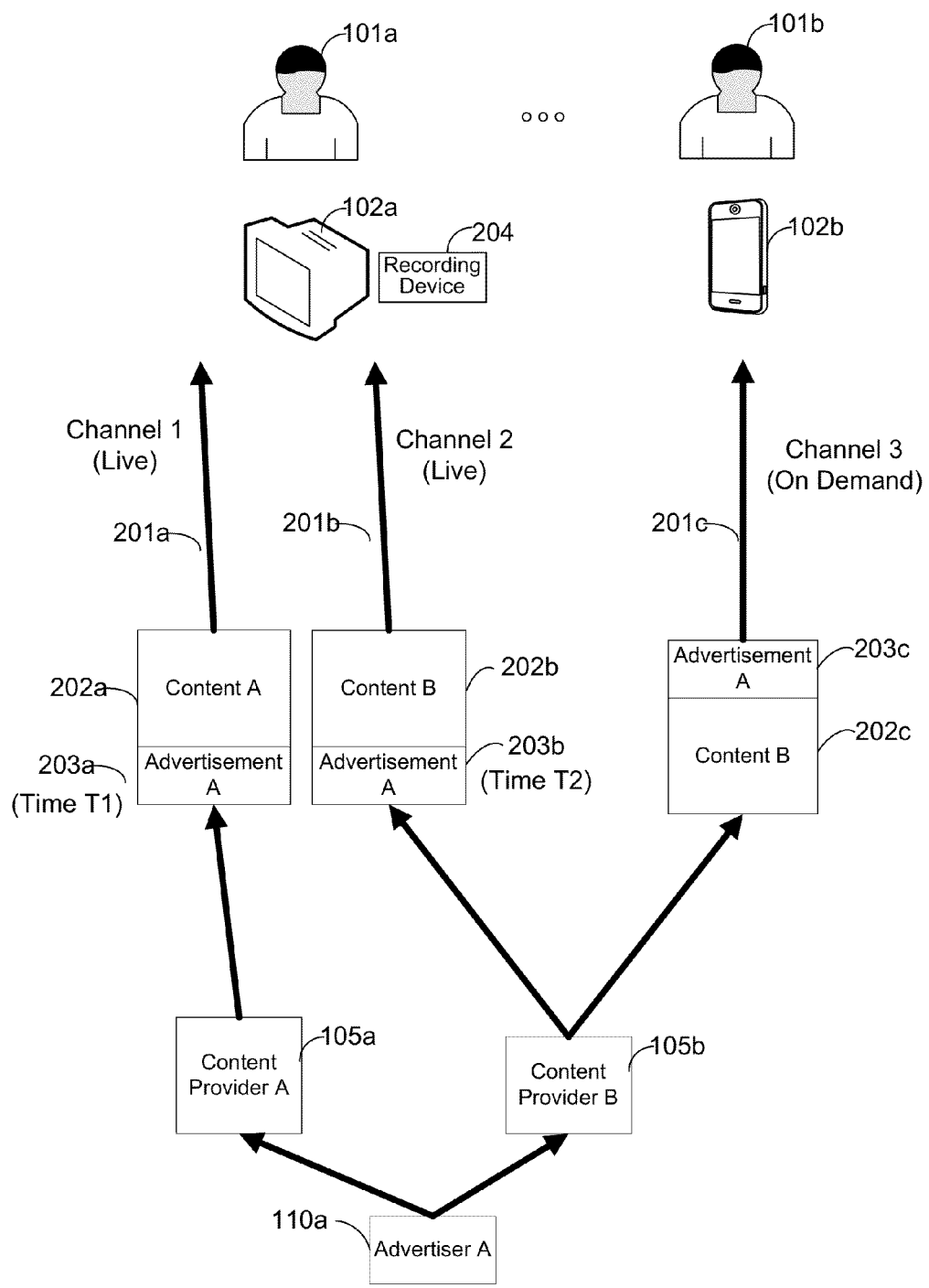
FIG. 2 is a block diagram depicting an example advertisement distribution through various channels.

Various of the disclosed embodiments contemplate assessing advertisement viewership even when the advertisement is distributed across a plurality of different channels. FIG. 2 is a block diagram depicting an example advertisement distribution through various channels as may occur in certain embodiments. In the depicted example, advertiser A 110a has decided to distribute their advertisement through both content provider A 105a and content provider B 105b. In response, content provider A 105a may provide content to a viewer 101a via a first channel 201a. The receiving device 102a may be a television set and first channel 201a may be a television network channel. Content provider A 105a may transmit content A 202a (e.g., a situational comedy) interspersed with commercial breaks, during at least one of which advertiser A's advertisement 203a may appear at time T1.

The receiving device 102a may also be configured to receive media on a second channel 201b in the control of content provider B 105b. Content provider B 105b may also transmit content, here the instance of content B 202b (e.g. a historical documentary) interspersed with commercial breaks, during at least one of which advertiser A's advertisement 203b may appear at time T2. Advertisement instances 203a, b, c may all be different instances of the same advertisement message. In some embodiments, different instances may be tailored for different channels (e.g., dimensions reformatted, duration reduced, etc.). The time T1 may occur before, after, or simultaneously with the time T2 and the two times may be separated by an arbitrary amount of time, though in some embodiments on the order of hours or days. A recording device 204, e.g. a DVR, may be present at the receiving device 102a. The recording device may retain a copy of the content 202a-b and advertisements 203a-b for viewing at a subsequent time. Thus, even where T1 and T2 occur simultaneously, it is still possible that the same viewer 101a may view both instances 203a-b of the advertisement, e.g., by viewing one of the transmissions later with the aid of recording device 204.

In the depicted example, content provider B is also able to provide content via a third on-demand channel 201c. On-demand channel 201c could be an Internet website (e.g., YouTube) or an on-demand television service, e.g. a pay-per-view station. Accordingly, viewer 101b may view the content B instance 202c and the accompanying advertisement instance 203c at any time by issuing a request via the on demand channel 201c.

One will recognize that only some of the advertisement distribution possibilities have been illustrated in the example of FIG. 2. Various embodiments disclose systems and methods for acquiring, analyzing, and using the viewer count from many different channels, despite their disparate protocols and user behaviors. Advertisement assessment system 107 may infer viewership based on the channel changing behavior of the user. For example, device 102a may report the changing from a first channel 201a to the second channel 201b at a first time and subsequently changing to another channel at a second time. If the time T2 occurs between the first channel change time and second channel change time, advertisement assessment system 107 may infer that viewer 101a perceived advertisement instance 203b. The system may distinguish genuine viewership data from instances where the viewing device has been powered off using techniques described in, for example, U.S. Provisional Patent Application Ser. No. 61/691,924, filed Aug. 22, 2012, "SYSTEM AND METHOD FOR PROJECTING TELEVISION USER BEHAVIOR" incorporated herein by reference in its entirety for all purposes.

In contrast, viewer 101b may be required by content provider B 105b to watch the entirety of advertisement instance A 203c prior to delivering content B 202c. In such instances, upon receiving viewing data indicating that content B was requested, advertisement assessment system 107 may always infer that viewer 101 perceived advertisement instance A 203c.

Data Normalizer Module

Figure 3:
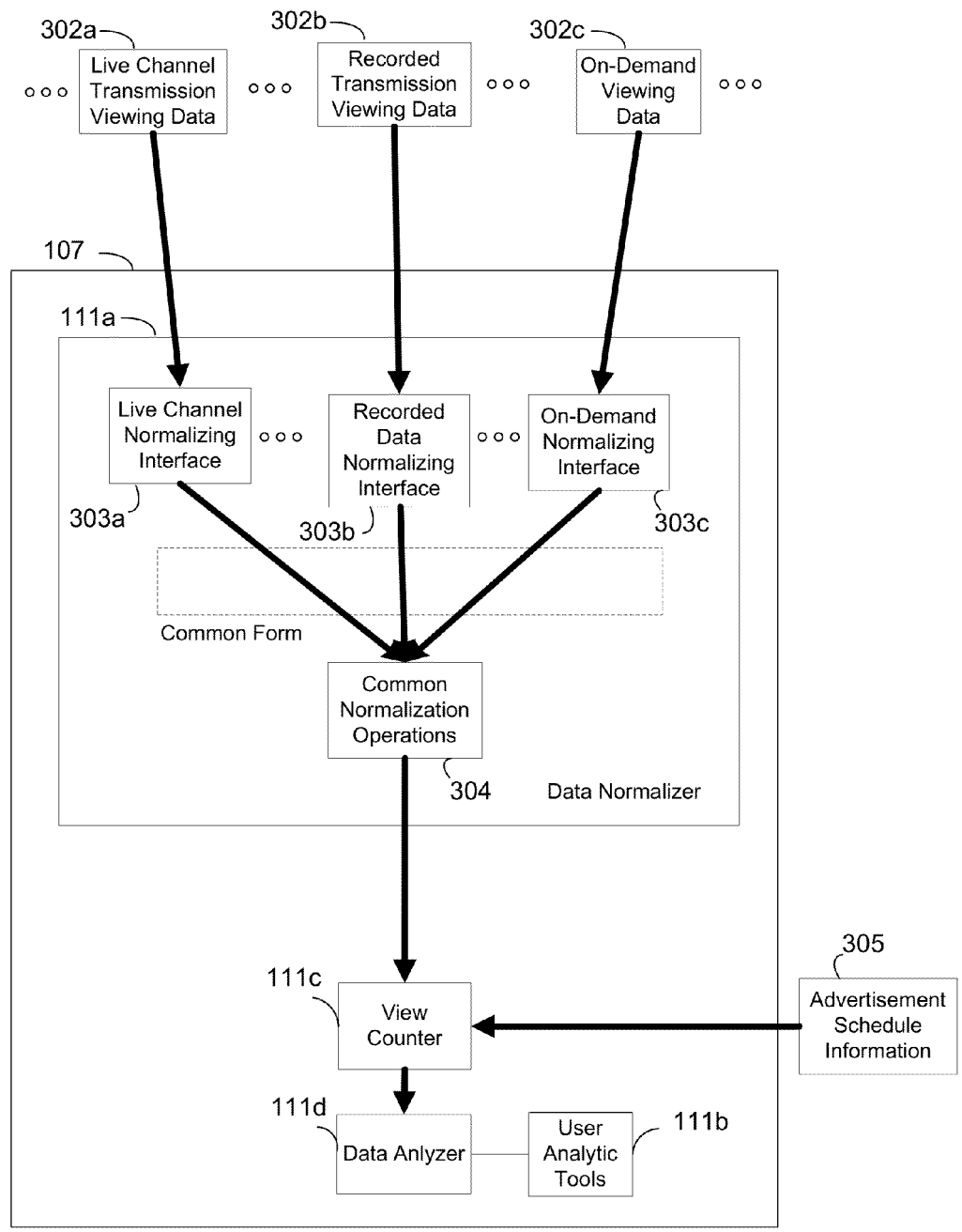
FIG. 3 is block diagram depicting various features in a data normalizer module.

The advertisement assessment system 107 may aggregate data from a variety of different recording and viewing methodologies, e.g., as previously described with respect to FIG. 2. FIG. 3 is block diagram depicting various aspects of a data normalizer module 111a to aggregate viewing data from across the different recording and viewing methodologies. A variety of different viewing data forms 302a-c may be submitted to the system. For example, viewing data 302a may include live channel viewing data, e.g., tune data from a set top box or recording device 204.

A live channel normalizing interface module 303a converts the live channel viewing data to a common form facilitating analysis. For example, the interface module 303a may infer periods of channel viewership from the channel change data. In some instances the interface module 303a may use techniques to infer that the user is not viewing an advertisement based on the channel change data. For example, the interface may ignore instances when a viewing device is turned off, as estimated using the techniques described in United States Non-Provisional patent application Ser. No. 13/686,762, filed Nov. 27, 2012, "METHOD AND SYSTEM FOR DETECTING NON-POWERED VIDEO PLAYBACK DEVICES" incorporated herein by reference in its entirety for all purposes.

The recorded data normalizing interface module 303b receives recorded transmission viewing data 302b and converts the data to a common form, which may be similar to, or the same as, the common form produced by interface module 303a. Recorded transmission viewing data 302b may include DVR data indicating when content was stored, played, fast-forwarded, etc. Interface module 303b may filter the viewing data, e.g., excluding portions which were fastforwarded, skipped, etc. so that only portions which were viewed remain.

The on-demand normalizing interface module 303c converts on-demand viewing data 302c to a common form. In some embodiments, the on-demand normalizing interface module 303c may group on-demand requests that resulted in viewing the advertisement.

In some embodiments, the system may also perform common normalization operations using module 304. For example, the common form data representing content delivery across multiple channels may not share a common timebase, such as when the channels span multiple timezones. As a result, the system may adjust the common form data to account for various geographic offsets, such as timezone variation. The module 304 may replace the disparate representations with a common indication of the data (e.g., the time relative to UTC).

After normalization, the common data is provided to the view counter module 111c for a determination of how many times each advertisement was viewed in the viewing data. Where the viewing data includes an identifier for an advertisement, the view counter 111c may determine the viewing counts for each advertisement using the identifier. In some instances, the view counter module 111c may instead refer to a schedule of advertisement information 305, which may be provided by an advertiser or content provider. The view counter 111c may correlate the schedule of advertisement information 305 with the common form viewing data, identifying overlaps as described in greater detail below, to determine the viewing counts for each advertisement. The data analyzer 111d, possibly in conjunction with user analytic tools 111b, may then be used to identify and/or present to a user 109 patterns in the viewing data.

Though the interface modules 303a-c may facilitate analysis by converting and/or redacting the viewing data 302a-c to a form susceptible to review, in some embodiments the interfaces may also retain data unique to each viewing dataset, e.g., as metadata. In this manner, the data analyzer 111c and possibly user analytic tools 111b may enhance data interpretation by referring to the accompanying metadata. For example, after receiving a gross determination of the number of times an advertisement was viewed, a user, e.g. an advertiser, may then filter the view counts to see what percentage of the views were derived from DVR views, on-demand requests, channel transmission viewings, etc. The user may then adjust their advertisement campaign to complement the identified strengths and weaknesses of the various distribution mediums.

The interfaces may be software, firmware, or hardware modules. One will recognize that the viewing data 302a-c may arrive at different times and that the normalizer may delay distribution of the common form data until an appropriate interval has elapsed.

Overview of Advertisement Assessment Process

Figure 4:
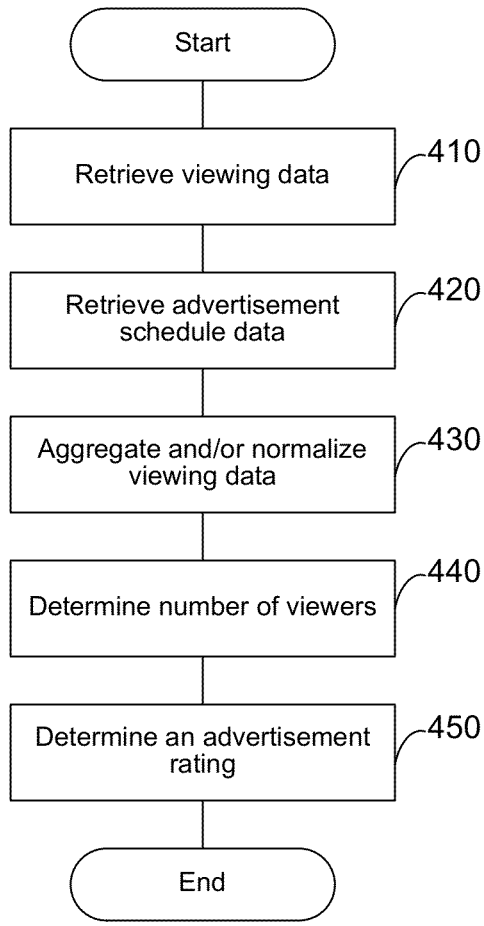
FIG. 4 is a flow diagram depicting certain steps in a process performed by an advertisement assessment system.

FIG. 4 is a flow diagram depicting certain steps in an advertisement assessment process 400 as may be implemented by the advertisement assessment system 107. At step 410, the system retrieves viewing data from multiple recording devices, e.g. set top box 103, software, firmware, or hardware on devices 102a-c, integrated television tuners, digital video recorders, etc. The viewing data may be retrieved locally (e.g., from a stored cache), directly from a recording device, by issuing a request to a repository 106, etc. The viewing data may contain information about a user's viewing activities associated with at least one network or channel over a period of time. In some embodiments, the viewing data may contain a record of tuning devices that were tuned to a particular network or channel during a particular period. The viewing data may be received directly from the tuning devices, or may be provided by an aggregator of such data (e.g., a cable operator, satellite operator, or other network operator).

At step 420, the system may retrieve advertisement schedule data. The advertisement schedule data may identify at least one advertisement, an associated network or channel on which the advertisement was presented, and associated beginning and ending times of the advertisement. In some embodiments, the television advertisement schedule data may be provided by one or more third parties, such as media measurement companies, television content providers, or television service providers, etc. (e.g. content provider 105b may provide the information directly to system 107). For example, a media measurement company may provide advertisement schedule data in the form of a database of national advertisement insertions. In another example, a television content provider or television service provider may provide a portion of the advertisement schedule data in the form of "as-run logs." In some embodiments, a user may provide all or a portion of the advertisement schedule data, such as by manually entering the information into the system via a software user interface. Step 420 may not occur separately from step 410 in some embodiments when the identity of the advertisement may be determined from the viewing data at step 410. For example, the viewing data may itself comprise an indication of the advertisements viewed.

At step 430, the system aggregates and/or normalizes the viewing data from the multiple recording devices into aggregate viewing behavior information. Aggregation may include combining the viewing data of different kinds of recording devices, e.g., as discussed with respect to FIG. 3. Each of the recording devices may have different capabilities and protocols. For example, data from recording devices (e.g., one or more of receiving devices 102a-c) allowing time shifting (e.g., DVR or devices supporting "on-demand" viewing) may be combined with devices which may allow only live viewing. Devices having different recording granularities may also be integrated. For example, recording devices which record viewing behaviors to the nearest second (e.g., some DVRs) may be combined with device mediums recording viewing behaviors only to the nearest 15 minute, or ¼ hour resolution.

At a step 440, the system determines the number of viewers who were exposed to an advertisement. In some instances, the system may compare the advertisement's beginning and ending times on an associated network and determine how many viewers were likely watching that network at that time. For example, the system may use data from set top boxes to determine how many viewers were tuned to the network at the time of the advertisement. In some embodiments, certain of the recording devices may include information regarding the advertisement schedule, and so the system may incorporate this information during the aggregation phase, e.g., step 430.

At step 450, the system may determine an advertisement rating based on the determined number of viewers. Various methods for performing this determination are provided below, including a further discussion with respect to FIG. 13.

Graphical User Interface—Advertisement Schedule Data

In some embodiments, the advertising assessment system 107 may allow the various information received, calculated, determined, stored, derived, etc. herein to be presented to a user. Such a presentation may be static or may dynamically update the presentation as additional data is received.

FIG. 5 is a data table 500 depicting advertisement schedule data as may be received by the advertising assessment system 107, as well as analysis data generated by the system. Table 500 may be presented to the user during, or following, analysis via user interface 108. Though the depicted information in the table 500 is represented in tabular format, one will recognize that the assessment system may receive the data via a plurality of packets, via requests to a variety of databases (e.g. SQL databases), or any other acceptable method for acquiring the data.

In the depicted example, each row in the table may represent a particular advertisement, or an instance of an advertisement. The columns in the table may contain data characterizing each advertisement, e.g., when the corresponding advertisement was presented to viewers. The table 500 may include an Advertiser/Brand column 510 that is populated with the advertiser associated with the advertisement (e.g., "ARCO" for an entry 570). The table 500 may include a Category column 520 which contains a classification of the advertisement (e.g., "Petroleum Companies" for the entry 570). The table 500 may include an Advertisement Copy column 530 which provides a brief description that may be used to help identify the advertisement (e.g., "Straight Up Gas: No More Fees . . . " for the entry 570). The table 500 may include an advertisement Time Offset column 540 which indicates the elapsed time, as measured from the beginning of the program, at which the advertisement was shown. For example, a time offset of 0:19:00 may indicate that an advertisement started 0 hours, 19 minutes, 0 seconds from the program's start. The table 500 may include an Advertisement Duration column 550 which indicates the length of the advertisement in minutes and seconds. The table 500 may include a Group Position column 560 which indicates the position of the advertisement with respect to the other advertisements that were shown in the same group or ad pod. For example, an Advertisement Group Position value of three may indicate that the advertisement is the third advertisement within that contiguous grouping of advertisements.

In the depicted example, all the advertisements of FIG. 5 are associated with a particular network name or channel identifier (e.g., "ABC"), a particular program name (e.g., "Lost, Season 6, Episode 14"), and a particular Program start time (e.g., "May 11, 2010, at 9:00:00 PM, Eastern Standard Time"). However, other implementations may provide advertisement schedule data for multiple programs, with different channels and/or program start times associated with those programs and advertisements. In some embodiments, the viewing data received at step 410 may be used to derive some of the advertisement schedule data. For example, the system may use the viewing data to determine the time offset 540, the duration 550, and/or the Ad Group Position 560 of one or more advertisements.

Though depicted here as a table having rows and columns one will recognize that when presented to a user in a GUI, the data depicted here can be presented in a plurality of different formats, e.g. as a collection of icons, a hierarchical tree, etc.

Graphical User Interface—Aggregated/Normalized Viewing Data

Figure 6:
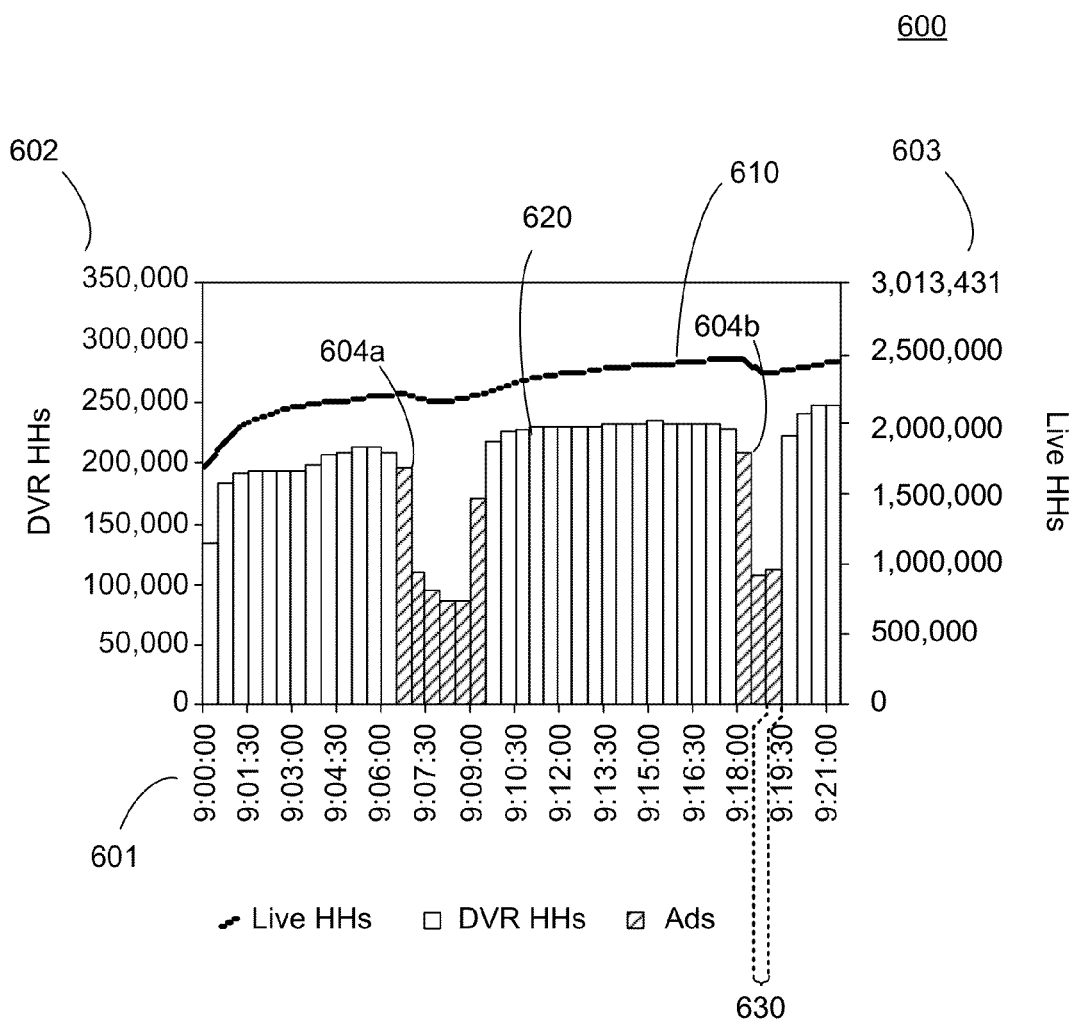
FIG. 6 is a graph illustrating aggregated/normalized viewing data as may be presented to a user in a GUI.

FIG. 6 is a graph 600 illustrating aggregated viewing data as may be prepared by the system. In some embodiments the graph 600 may be graphically displayed in a user interface 108 as described in greater detail below. Here, the graph 600 depicts aggregated viewing data, including live broadcast households data 610 and DVR households data 620. In some circumstances, the viewing data from multiple television tuning devices are received in a form that is already aggregated.

In some embodiments, the system allows the various information received, calculated, determined, stored, derived, etc. herein to be presented to a user and/or for the user to participate in one or more of those steps. Such a presentation may be static (e.g., a printed out hardcopy report) or interactive (e.g., presented on a computer display with one or more of animation, response to mouse clicks, response to touch screen input, and so on). In some embodiments, the system may present the information shown in FIG. 6 in an interactive manner. For example, when the user clicks, taps, or otherwise selects the interval 630, the corresponding information for an advertisement in that interval may be presented in a pop-up box or other display. In some embodiments, when the user clicks on the interval 630 or the entry 570, the system may present a more detailed depiction of the content associated with that region or entry, e.g. a video of the advertisement, additional demographic data, etc. The user may specify various search or analysis criteria, such as specifying the time duration for which the DVR viewing data 620 is analyzed, or which program, programs, channels, time periods, advertisers, brands, advertising category, and so on are to be analyzed.

Graphical Interface Presentation—Advertisement Instance Review

FIG. 7 is an illustration of a GUI 700 depicting an advertisement occurrence search that is generated by the system. The GUI 700 may include a date range selection 701 and a plurality of field entries 702a-e. The date range selection 701 may be used to restrict the search to advertisement instances which were presented on a channel within a particular time range. In some embodiments, DVR and recorded instances which were subsequently viewed after the time range, may be included in the search results if the advertisement instances was originally distributed at a time within the time range.

Within the plurality of field entries 702a-e may be a parent identifier 702a, an advertiser identifier 702b, a category identifier 702c, a brand name identifier 702d, and a product field 702e. The parent identifier 702a may be used to identify a "parent" organization or company which has commissioned the placement of the advertisement(s). In the depicted example, the Apple Computer company 703 has requested the distribution of the advertisement(s). In the depicted example, Apple Computer has commissioned two advertisers 704 (indicated by "apple" and "Apple" respectively) to distribute the advertisement(s). The example advertisement(s) are in the "Wireless Home/Business Products" category 705, are of the Apple iPhone brand 706, and are associated with either the products 707 Apple iPhone 5 or Apple iPad. In some embodiments, the information for filling the field entries 702a-e is provided by the parent company producing the advertisement or the advertiser. The field entries 702a-e may correspond to tags which are associated with an advertisement instance. When the system identifies a viewing count for the instance, the system may ensure that the corresponding tags associated with these field entries are associated with the count so that the advertisement and count results may be located using this search interface 700.

FIG. 8 is an illustration of a GUI 800 depicting a listing 801 of advertisement copies/instances that is generated by the system. In some embodiments, the listing 801 may be returned to the user following selection of the search request from FIG. 7. In the depicted example, four advertisement copies/instances 800 have been identified. An advertisement copy detail section 802 may depict the particular metatag details associated with the advertisement instance that corresponded to the search query. For example, the activity window 803 may indicate times in which the advertisement instance was to be presented to a user and the duration 804 may indicate how long the advertisement instance lasted.

In an airings sections 805a-c the system may depict the overall 805a and month-by-month 805b, 805c airing results. Each of the airings sections 805a-c may depict the number of airings of the corresponding instance and the number of networks across which the instance was aired. In some embodiments the networks may include television network channels, radio networks, separate websites, on-demand services, and other individual distribution channels.

Figure 9:
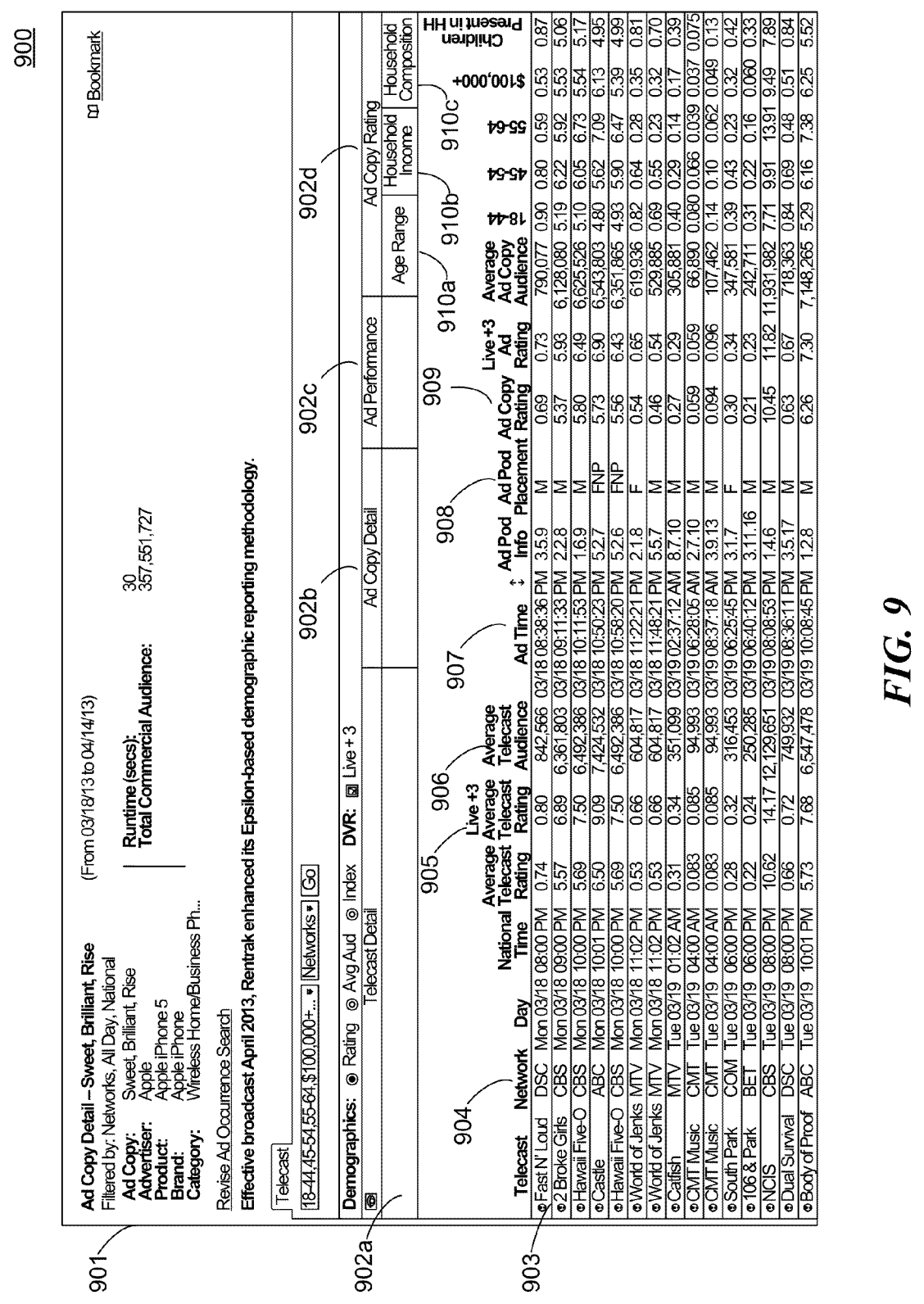

FIG. 9 is an illustration of a GUI 900 depicting an advertisement detail that is generated by the system. The GUI 900 may be presented to a user following a selection of one of the entries in FIG. 8. A reference section 901 may indicate the metatag data associated with the advertisement instance. In a telecast data section 902a the analysis results for the advertisement instance, e.g. as determined using the methods described below, in relation to a content telecast may be provided. For example, in telecast details section 902a the GUI may indicate that the television show "Fast N'Loud" 903 was broadcast on a network indicated by "DSC" 904, and may indicate the ratings of the content 905 and content audience 906. The GUI may also depict advertisement copy details in an advertisement copy detail section 902b.

An advertisement performance information section 902c and copy rating section 902d, may also be provided. The advertisement copy detail section 902b may depict, e.g., the time 907 and placement 908 of the advertisement in the content. The advertisement performance section 902c may depict, e.g., the rating of the advertisement instance 909.

The advertisement copy/instance rating section 902d may depict various viewer demographics for those who viewed the advertisement instance, e.g. the viewer's age 910a, household income 910b, and composition 910c.

Graphical Interface Presentation—Process

Figure 10:
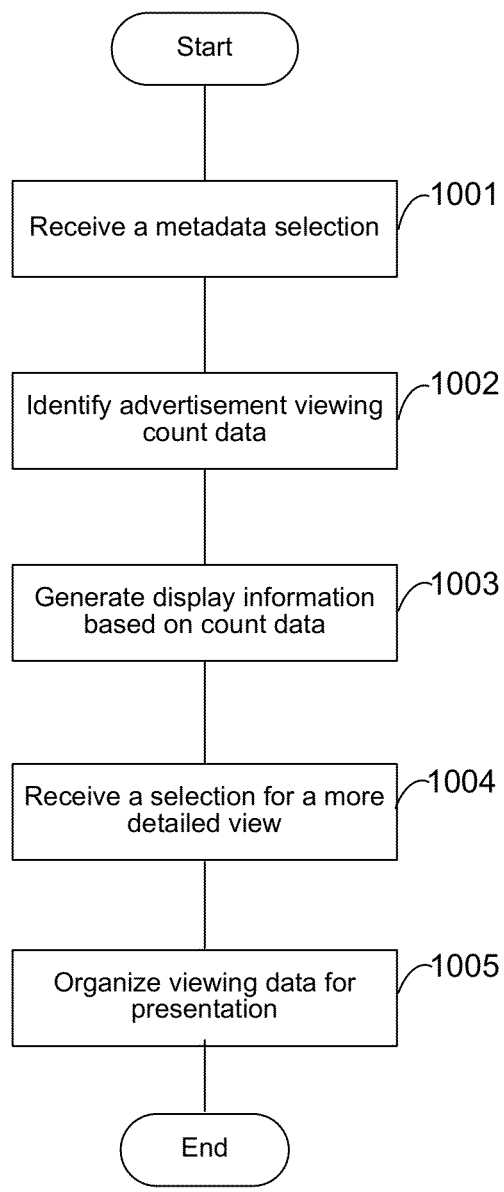
FIG. 10 is a flow diagram depicting certain steps in a data display process as may be implemented by the system with a user interface.

FIG. 10 is a flow diagram depicting certain steps in a data display process as may be implemented with a user interface by the system. At step 1001 the system receives a plurality of metadata selections from a user, e.g., a selection of metatag fields as in FIG. 7. At step 1002 the system identifies advertisement viewing count data based on the metatag fields. At step 1003 the system populates a listing based on a portion of the corresponding viewing count data, e.g., in a GUI such as depicted in FIG. 8. At step 1004 the system receives a selection from the user for a more detailed view of at least one of the listings. For example, the user may tap, click, or otherwise select a row from FIG. 8. At step 1005 the system organizes the viewing data corresponding to the selection and presents the data to the user. For example, the system may organize data corresponding to an advertisement instance based on the content in which it was transmitted as depicted in FIG. 9.

Data Normalization Process

Figure 11:
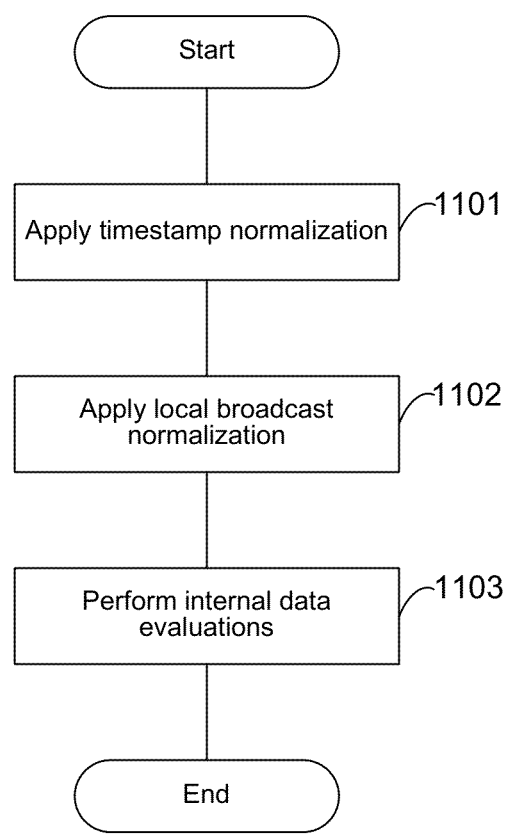
FIG. 11 is a flow diagram depicting certain steps in a data normalization and preparation process implemented by the system.

FIG. 11 is a flow diagram depicting certain steps in a data normalization and preparation process 1100 as may be implemented by the system. Various of the steps in FIG. 11 may occur before, during, or after the aggregation/normalization step 430 in FIG. 4. As mentioned, although the steps in FIG. 4 are depicted in a particular order for ease of explanation, one will recognize that the steps therein may be performed in different orders in some embodiments. The steps in FIG. 11 may similarly be performed in a different order than that presented.

As mentioned, the recording devices may be created by a plurality of different manufacturers, which may operate by different protocols, and be managed differently by different operators. Normalizing the data across all this variation facilitates analysis using tools configured to operate on a unified format as described above with respect to FIG. 3.

At step 1101 of the normalization process 1100, the data from some or all of the multiple recording devices may be corrected for timestamp variation. Additionally, or alternatively, correction may be employed to some or all of the viewing data to correct for equipment timing data, such as clock drift associated with some set top box or other recording devices located on or near viewer premises.

At step 1102, the system may apply local broadcast normalization if necessary. In some embodiments, local preemption of a national network schedule (e.g., if a local "breaking news" event preempts a scheduled broadcast) may be corrected for at this step. Such corrections may necessitate adding or subtracting a time offset to some or all of the data of the affected television tuning devices. In some instances, the preemptions may require discarding data suspected to be inaccurate.

At step 1103, the system may perform internal data evaluations. In some embodiments, patterns within the data may be used to assess the data's accuracy. For example, the aggregated data's correlation may be analyzed to determine the accuracy of the data. Data that behaves in a synchronized manner (for example, indicating channel change events precisely at the start of a commercial break) may be determined to have higher accuracy and quality than data which is not synchronized in its behavior (which may indicate that correction is necessary).

Viewer Count Determination

Figure 12:
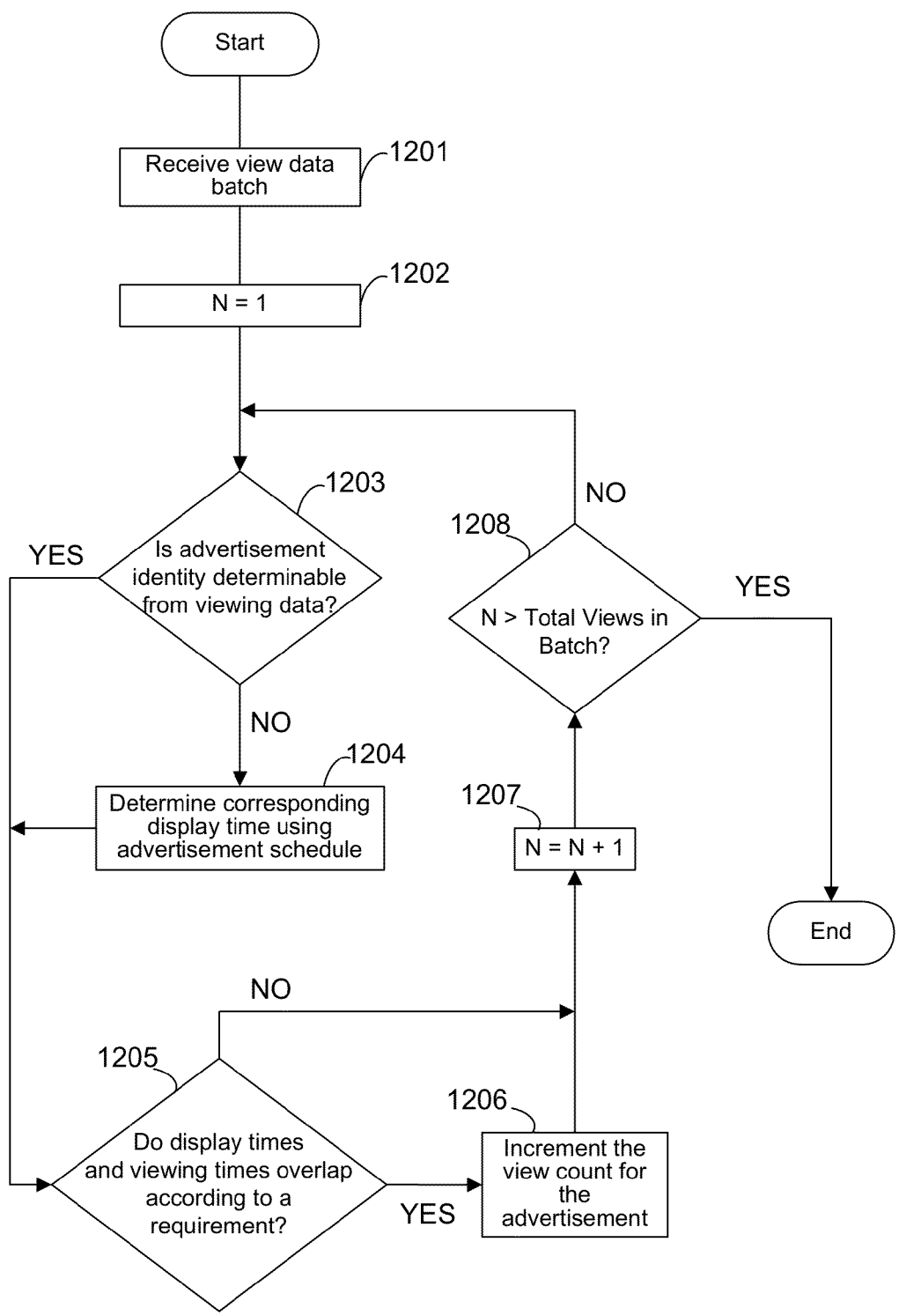
FIG. 12 is a flow diagram depicting certain steps in a viewer count determination process implemented by the system.

FIG. 12 is a flow diagram depicting certain steps in a viewer count determination process 1200 as may be implemented by the system. Though depicted for purposes of explanation as an iteration over a collection of view data in a batch, one will recognize that certain of the operations (e.g., steps 1203-1206) may be performed on a rolling basis as data comes in, following a user request, etc. In the depicted example, at step 1201 the system may receive a new batch of viewing data, such as by polling a repository 106. Batches of viewing data may be organized in groups based on data that has or has not yet been reviewed. For example, the repository may retain a buffer or data stack. As viewing data on the stack is reviewed, the data may be popped from the stack.

Steps 1202, 1207, and 1208 illustrate the iterations among the batch members that may be performed. One will recognize that the particular form of the iteration provided in this figure is exemplary, and that substitute iterations may be performed that achieve substantially the same functionality.

At step 1203, the system may determine if the viewing data under consideration includes information regarding the content being viewed, e.g., if it includes an indication, such as an identifier, of the advertisement. If the viewing data contains sufficient information to determine if an advertisement was viewed, the system may proceed to step 1205 and determine whether the display and viewing of the advertisement overlaps for more than a threshold, e.g., that the advertisement was viewed for a sufficiently long period that it could be inferred that the viewer was exposed to its content.

If the viewing data does not include an indication of the content being viewed, at step 1204 the system may instead determine a corresponding display time using information in an advertisement schedule. For example, in some embodiments, the number of viewers who viewed an advertisement may be determined by combining the aggregated viewing information with the advertisement schedule data. The system may then make the determination based on the starting time of the advertisement, which can be calculated by taking the program start time (e.g., May 11, 2010, 9:00 eastern standard time) and adding the advertisement Time Offset 540 to it (e.g., +19 minutes, 0 seconds for the advertisement represented by entry 570) to arrive at the advertisement starting time (e.g., May 11, 2010, 9:19:00 EST; illustrated at left of interval 630 in FIG. 6). The advertisement ending time may also be utilized in the determination of the average number of viewers who viewed the advertisement, such as by adding the advertisement starting time with the advertisement duration (e.g., 30 seconds) to arrive at the advertisement ending time (e.g., May 11, 2010, 9:19:30 EST; illustrated at right of interval 630 in FIG. 6).

Once the start and end times of an advertisement have been correlated with the viewing data, the number of viewers may be determined individually for different data sets or in aggregate across all data sets (e.g. at step 1205). For example, with continued reference to the data depicted in FIG. 6, the "Live Household" data 610 (illustrated as "Live HHs") may be used to determine the number of Live households that are exposed to the advertisement. For interval 630, the number of live households exposed to the advertisement shown during that interval is approximately 2,380,000. In some embodiments, once the number of live households is determined, the number may be stored in a "Live HHs" column 582 (e.g., 2,380,000 for entry 570) in the data table 500. Similarly, from the DVR viewers data 620, the number of DVR households that are exposed to the advertisement may be determined. For interval 630 in the example of FIG. 6, the number of DVR households is 112,000. The system may store the number of DVR households in a "DVR HHs" column 584 of the table 500. The "Total HHs" column 586 of the table 500 represents the sum of the "Live HHs" column 582 and the "DVR HHs" column 584 (e.g., the 2,492,000 "Total HHs" figure shown for the entry 570 represents the sum of 2,380,000 "Live HHs" and 112,000 "DVR HHs"). In some embodiments, a viewer determined to be represented in both the "Live HHs" data and the "DVR HHs" data, and having watched the advertisement on both Live and DVR equipment, may be excluded from the combination so as not to be counted twice in the combined total.

Various mathematical algorithms may be employed by the system to determine the number of viewers associated with an advertisement based on viewing data. The viewers may include both live viewers viewing the advertisement when it is transmitted, and those who view it subsequently, e.g., via DVR.

In one algorithm, the system may average the advertisement starting and ending times (e.g., the left and right edges of interval 630), or otherwise determine the time of the middle of the advertisement. The system may then determine the number of viewers for the middle time to approximate the number of viewers who were exposed to the advertisement. In another algorithm, the system may determine the area under the curve 610 representing the advertisement (e.g., by mathematical integration of the viewing data), and divide the result by the advertisement duration to determine the average number of viewers. In yet another algorithm, the system may look at the maximum number of viewers who were exposed to any portion of the advertisement, e.g., it will count any viewers who were exposed to any portion of the advertisement as having been exposed to the entire advertisement.

In still another algorithm, the system may ignore some period of time at the beginning and/or ending of the advertisement to increase the measurement accuracy when the underlying viewing data has some timing inaccuracy or error. For example, the system may discard the first and last five seconds of viewership data associated with an advertisement if the accuracy of the timing data may have an inherent error of +/−2 seconds and when the viewing data is available in five second intervals. Another example algorithm implemented by the system may look at the minimum number of viewers, e.g., the system may only count the number of viewers who watched the entire advertisement, and may not count someone who watched only a portion of the advertisement (e.g. a threshold at step 1205 may require that the entire advertisement be viewed for a view count to be registered). Other example algorithms may be based on median, mode, weighted averages, and/or various combinations of the aforementioned algorithms and data sets.

Advertisement Rating Determination

Figure 13:
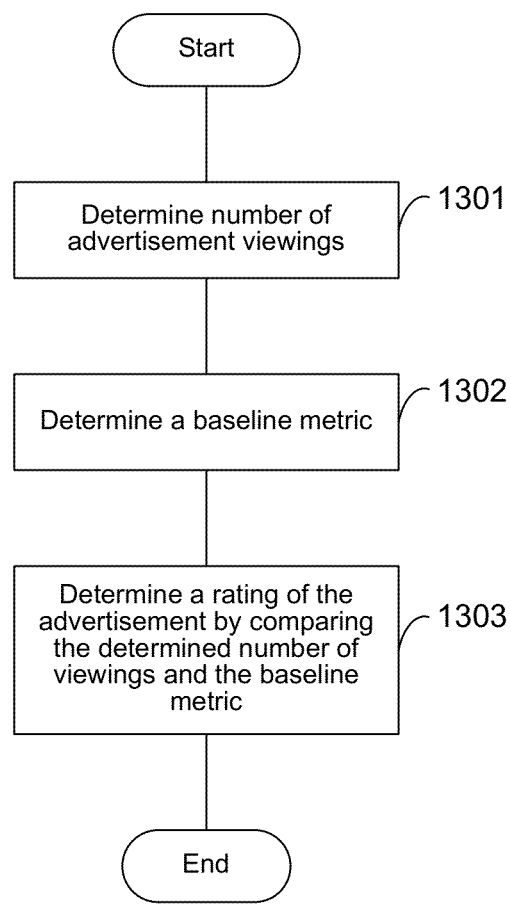
FIG. 13 is a flow diagram depicting certain steps in an advertisement rating determination process implemented by the system.

FIG. 13 is a flow diagram depicting certain steps in an advertisement rating determination process 1300 as may be implemented by the system. Process 1300, may be run as, or in conjunction with, step 450.

At step 1301, the system may determine the number of viewings for an advertisement, e.g., using the process of FIG. 12.

At step 1302, the system may determine a baseline metric for use in assessing the relative value of the number of advertised viewings. In some embodiments, the baseline metric may be a total possible number of households for which data is available ($N_{Total}$) within a particular period of analysis.

At step 1303, the system may determine a metric for comparison with other advertisements, such as a rating of the advertisement, by comparing the determined number of viewings with the baseline metric. For example, in some embodiments, to calculate the ratings index of an advertisement, the system may divide the number of total households exposed to, or who viewed, the advertisement ($N_{Viewed}$) by the total possible number of households for which data is available ($N_{Total}$). For example, $N_{Total}$ may represent the total number of known households, which could, in theory, have been watching the advertisement at the displayed time. The system may then scale the resulting number to convert the number into a range (Range) that allows easy analysis and comparison (e.g., a scale of 0-100). For example:

$$\text{Ranking(Advertisement)} = \text{Range} * N_{Viewed} / N_{Total}$$

In the depicted example of FIG. 6, there is a possible maximum number of viewing households of 26,560,417. Dividing the number of viewers by the maximum possible number of viewers and multiplying it by 100 results in a rating index of 9.283 (i.e., 2,492,000 "Total HHs" divided by 26,560,417 maximum number of viewing households, multiplied by 100, equals a 9.382 advertisement rating). The result may be stored by the system in an Advertisement Ratings column 590 in table 500 and may be presented to a user view a graphical interface as described elsewhere herein.

In some embodiments, the baseline metric at step 1302 may be modified dynamically. In some embodiments, the total number of households for which data may be analyzed may be reduced if the analysis focuses only on a particular viewer demographic, particular region, or particular characteristic. For example, a user may specify a particular demographic to be analyzed, such as only women or only adults between the ages of 20-30. In that case, the system may filter the data to reflect only the selected demographic. To calculate the ratings index, the households exposed to the advertisement in that demographic may be divided by the total number of households in that demographic. Alternatively, the user may specify that the rating index be calculated for the city of Chicago. In that case, the system will filter the data to reflect only those households in the city of Chicago in the calculation. One will recognize additional subsets which may be selected for analysis.

Advertiser Price Adjustment

Figure 14:
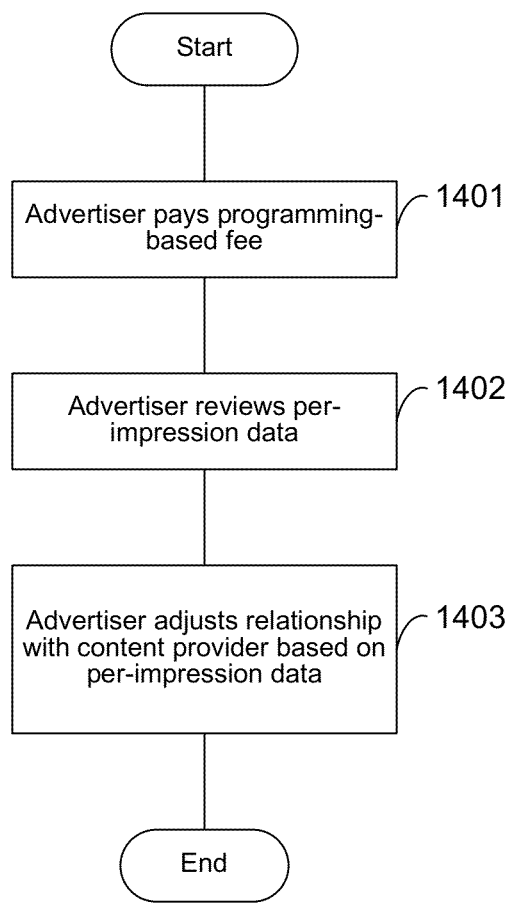
FIG. 14 is a flow diagram depicting a feedback process for advertiser price adjustment.

FIG. 14 is a flow diagram depicting a feedback process for advertiser price adjustment as may be applied by the system. At step 1401, the advertiser may pay for an advertisement based on the "programming-based" methods of the content provider. In the absence of per-impression information (e.g, the actual number of advertisement viewings that occurred) from the advertisement assessment system 107, the advertiser may pay for advertisement space according to the conventional metrics of the content provider, e.g. TVR ratings.

At step 1402, the advertiser may use the advertisement assessment system 107 to determine the "per-impression" impact of their advertisements. The advertiser may identify channels and content more favorable for reaching viewers than other channels and content based on the per-impression data.

At step 1403, the advertiser may adjust their arrangement with the content provider to reflect the per-impression data. Particularly, the advertiser may negotiate a lower price for those advertisement locations that consistently receive fewer views or may request a new pricing arrangement based on the determined number of views.

Computer System Overview

Those skilled in the art will appreciate that the advertisement assessment system 107 may be implemented on any computing system or device. Suitable computing systems or devices include server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Remarks

The use of the word "channel" herein can mean any path or medium through which particular television or video content is distributed, for example: an analog or digital broadcast or demodulation frequency, a "real" channel (which may correspond to an actual transmission frequency), a "virtual" channel (not representing an actual frequency), a main channel by itself, a sub channel number by itself, or a main channel combined with a sub channel, a digital networking address such as an internet protocol ("IF") address, a uniform resource locator ("URL"), or a video sharing website channel (such as a YouTube user's content channel), a call sign or network name (e.g., "ABC"), a program or syndicated content identifier (e.g., "Superbowl 2011", "Seinfeld season 3, episode 2", the name of a pay per view program), any content selector utilized for cable television, broadcast television, satellite television, and so on.

Although the subject matter has been described in language specific to structural features and/or methodological acts, it is to be understood that the subject matter defined in the appended claims is not necessarily limited to the specific features or steps described above. Rather, the specific features and steps described above are disclosed as example forms of implementing the claims. Accordingly, the claimed embodiments are not limited except as by the appended claims. A computer-readable medium as referred to herein may be a single medium or multiple media (e.g., a centralized or distributed database, and/or associated caches and servers) that stores the one or more sets of instructions. The term "computer-readable medium" may also be taken to include any medium that is capable of storing, encoding or carrying a set of instructions for execution by the computer and that cause the computer to perform any one or more of the methodologies of the presently disclosed technique and innovation. Some routines executed to implement some of the embodiments of the disclosure, may be implemented as part of an operating system or a specific application, component, program, object, module or sequence of instructions referred to as "programs." The programs may comprise one or more instructions set at various times in various memory and storage devices in a computer, and that, when read and executed by one or more processing units or processors in a computer, cause the computer to perform operations to execute elements involving the various aspects of the disclosure.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

Aspects of the disclosure can be modified, if necessary, to employ the systems, functions, and concepts of the various references described above to provide yet further embodiments of the disclosure. For example, although various steps have been discussed in certain of the flow diagrams, one will recognize that additional steps may be performed or depicted steps omitted to accomplish similar functionality. In some instances optional elements may be indicated by dashed outlines in the flow diagrams, whereas in other elements the optionality may be explicitly stated in the text. One will recognize that many process steps not explicitly indicated as being optional may also be optional depending upon the context. The illustrated example flow diagrams are provided for purposes of explanation rather than as limiting depiction of one or more embodiments. Accordingly the depicted steps are illustrative.

Those skilled in the art will appreciate that the logic and process steps illustrated in the various flow diagrams discussed below, may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limited the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer implemented method for analyzing viewing data to characterize viewership of media, the method comprising:
   retrieving data representing the viewing behavior of a plurality of viewers, the data reflecting viewing behavior on multiple different channels that are used to distribute media, the multiple different channels comprising at least:
      a channel providing live channel viewing data;
      a channel providing recorded transmission viewing data; and
      a channel providing on-demand viewing data;
   normalizing the live channel viewing data, the recorded transmission viewing data, and the on-demand viewing data to adjust for timestamp variations;
   normalizing at least one of the live channel viewing data, the recorded transmission viewing data, and the on-demand viewing data to adjust for a local broadcast;
   retaining at least a portion of the live channel viewing data, the recorded transmission viewing data, and the on-demand viewing data as metadata;
   retrieving a presentation schedule including displaying periods associated with media;
   normalizing the presentation schedule to adjust for timestamp variations;
   determining an average number of viewers of the media based on an overlap between at least a portion of the live channel viewing data, at least a portion of the recorded transmission viewing data, at least a portion of the on-demand viewing data, and at least a portion of the presentation schedule; and
   generating a graphic comprising a plurality of intervals, each interval depicting the average number of viewers for at least two of the channel providing live channel viewing data, the channel providing recorded transmission viewing data, and the channel providing on-demand viewing data.

2. The method of claim 1, wherein the media comprises an advertisement.

3. The method of claim 1, wherein determining an average number of viewers of the media based on an overlap comprises determining that the overlap covers the entirety of a duration of the media.

4. The method of claim 1, wherein the different communication channels comprise one or more of a radio broadcast, a television broadcast, or a webpage accessible via the Internet.

5. The method of claim 1, further comprising:
determining a middle time of the media based on a start time and an end time of the media, and wherein
determining an average number of viewers of the media based on the overlap comprises determining the number of devices configured to receive the media at the middle time of the media.

6. The method of claim 1, wherein determining an average number of viewers of the media based on the overlap comprises:
summing a portion of at least one of the live channel viewing data, recorded transmission viewing data, and on-demand viewing data; and
dividing the result by a duration of the media to determine an average number of devices receiving the media.

7. The method of claim 1, wherein determining an average number of viewers of the media based on the overlap comprises counting any viewers exposed to a portion of the media as having been exposed to the entire media.

8. The method of claim 1, wherein determining an average number of viewers of the media based on the overlap comprises excluding a period of time at the beginning of the media based on a timing inaccuracy in at least one of the live channel viewing data, recorded transmission viewing data, and on-demand viewing data.

9. The method of claim 1, wherein determining an average number of viewers of the media based on the overlap comprises excluding a period of time at the end of the media based on a timing inaccuracy in at least one of the live channel viewing data, recorded transmission viewing data, and on-demand viewing data.

10. The method of claim 9, wherein a duration of the excluded period of time is greater than a duration of the timing inaccuracy.

11. A non-transitory computer-readable medium comprising instructions configured to cause a computer system to:
retrieve data representing the viewing behavior of a plurality of viewers, the data reflecting the viewing behavior on multiple different channels that are used to distribute media, the multiple different channels comprising at least:
a channel providing live channel viewing data;
a channel providing recorded transmission viewing data; and
a channel providing on-demand viewing data;
normalize the live channel viewing data, the recorded transmission viewing data, and the on-demand viewing data to adjust for timestamp variations;
normalize at least one of the live channel viewing data, the recorded transmission viewing data, and the on-demand viewing data to adjust for a local broadcast;
retain at least a portion of the live channel viewing data, the recorded transmission viewing data, and the on-demand viewing data as metadata;
retrieve a presentation schedule including displaying periods associated with media;
normalize the presentation schedule to adjust for timestamp variations;
determine an average number of viewers of the media based on an overlap between the live channel viewing data, the recorded transmission viewing data, the on-demand viewing data; and
generate a graphic comprising a plurality of intervals, each interval depicting the average number of viewers for at least two of the channel providing live channel viewing data, the channel providing recorded transmission viewing data, and the channel providing on-demand viewing data.

12. The non-transitory computer-readable medium of claim 11, wherein the media comprises an advertisement.

13. The non-transitory computer-readable medium of claim 11, wherein determining an average number of viewers of the media based on an overlap comprises determining that the overlap covers the entirety of a duration of the media.

14. The non-transitory computer-readable medium of claim 11, the instructions further configured to cause a computer system to aggregate at least one of the live channel viewing data, the recorded transmission viewing data, and the on-demand viewing data.

15. The non-transitory computer-readable medium of claim 11, the instructions further configured to cause a computer system to:
determine a middle time of the media based on a start time and an end time of the media, and wherein
to determine an average number of viewers of the media based on the overlap comprises determining the number of devices configured to receive the media at the middle time of the advertisement.

16. The non-transitory computer-readable medium of claim 11, wherein determining an average number of viewers of the media based on the overlap comprises:
summing a portion of the viewing data; and
dividing the result by a duration of the advertisement to determine an average number of devices receiving the advertisement.

17. The non-transitory computer-readable medium of claim 11, wherein determining an average number of viewers of the media based on the overlap comprises counting any viewers exposed to a portion of the advertisement as having been exposed to the entire advertisement.

18. The non-transitory computer-readable medium of claim 11, wherein determining an average number of viewers of the media based on the overlap comprises excluding a period of time at the beginning of the advertisement based on a timing inaccuracy in the viewing data.

19. The non-transitory computer-readable medium of claim 11, wherein determining an average number of viewers of the media based on the overlap comprises excluding a period of time at the end of the media based on a timing inaccuracy in at least one of the live channel viewing data, recorded transmission viewing data, and on-demand viewing data.

20. The non-transitory computer-readable medium of claim 19, wherein a duration of the excluded period of time is greater than a duration of the timing inaccuracy.

* * * * *